US012211306B2

(12) United States Patent
Xue et al.

(10) Patent No.: US 12,211,306 B2
(45) Date of Patent: Jan. 28, 2025

(54) METHOD FOR COUNTING SUCKLING PIGLETS BASED ON SELF-ATTENTION SPATIOTEMPORAL FEATURE FUSION

(71) Applicant: South China Agricultural University, Guangzhou (CN)

(72) Inventors: Yueju Xue, Guangzhou (CN); Haiming Gan, Guangzhou (CN); Wenhao Hou, Guangzhou (CN); Chengguo Xu, Guangzhou (CN)

( * ) Notice: Subject to any disclaimer, the term of this patent is extended or adjusted under 35 U.S.C. 154(b) by 282 days.

(21) Appl. No.: 18/093,340

(22) Filed: Jan. 5, 2023

(65) Prior Publication Data

US 2023/0147130 A1    May 11, 2023

(30) Foreign Application Priority Data

Nov. 1, 2022 (CN) .......................... 202211358233.X

(51) Int. Cl.
*G06V 40/10* (2022.01)
*G06T 7/73* (2017.01)
(Continued)

(52) U.S. Cl.
CPC ................ *G06V 40/10* (2022.01); *G06T 7/73* (2017.01); *G06V 10/25* (2022.01); *G06V 10/62* (2022.01);
(Continued)

(58) Field of Classification Search
CPC ...... G06V 40/10; G06V 10/25; G06V 10/806; G06V 10/7715; G06V 20/46; G06V 10/82; G06V 10/62; G06V 40/20; G06T 7/73
See application file for complete search history.

(56) References Cited

U.S. PATENT DOCUMENTS

| 2005/0001154 A1 | 1/2005 | Sumitomo et al. |
| 2007/0172873 A1 | 7/2007 | Brenner et al. |
| 2008/0194508 A1 | 8/2008 | Christensen et al. |

OTHER PUBLICATIONS

Wang, Q., Li, W., Chen, S., & Feng, R. (Jul. 2020). A Dynamic-Attention on Crowd Region with Physical Optical Flow Features for Crowd Counting. In 2020 International Joint Conference on Neural Networks (IJCNN) (pp. 1-8). IEEE. (Year: 2020).*

(Continued)

*Primary Examiner* — David Perlman
(74) *Attorney, Agent, or Firm* — Hemisphere Law, PLLC; Zhigang Ma

(57) ABSTRACT

A method for counting suckling piglets based on self-attention spatiotemporal feature fusion is disclosed, which includes: detecting a side-lying sow in a video frame by using CenterNet to acquire a key frame of suckling piglets and a region of interest of the video frame, and overcome the interference of the movement of non-suckling piglets on the spatiotemporal feature extraction for the region of interest; transforming spatiotemporal features extracted by a spatiotemporal two-stream convolutional network from a key frame video clip into a spatiotemporal feature vector, inputting the obtained spatiotemporal feature vector into a temporal, a spatial and a fusion transformer to obtain a self-attention matrix; performing element-wise product for the self-attention matrix and the fused spatiotemporal features to obtain a self-attention spatiotemporal feature map; and (Continued)

inputting the self-attention spatiotemporal feature map into a regression branch of the number of suckling piglets to complete the counting of the suckling piglets.

9 Claims, 7 Drawing Sheets

(51) Int. Cl.
    *G06V 10/25*     (2022.01)
    *G06V 10/62*     (2022.01)
    *G06V 10/77*     (2022.01)
    *G06V 10/80*     (2022.01)
    *G06V 10/82*     (2022.01)
    *G06V 20/40*     (2022.01)
    *G06V 40/20*     (2022.01)

(52) U.S. Cl.
    CPC ........ *G06V 10/7715* (2022.01); *G06V 10/806* (2022.01); *G06V 10/82* (2022.01); *G06V 20/46* (2022.01); *G06V 40/20* (2022.01); *G06T 2207/20084* (2013.01); *G06T 2207/30242* (2013.01)

(56) References Cited

OTHER PUBLICATIONS

Yang, A., Huang, H., Zheng, B., Li, S., Gan, H., Chen, C., . . . & Xue, Y. (2020). An automatic recognition framework for sow daily behaviours based on motion and image analyses. Biosystems Engineering, 192, 56-71. (Year: 2020).*

Gan, H., Li, S., Ou, M., Yang, X., Huang, B., Liu, K., & Xue, Y. (2021). Fast and accurate detection of lactating sow nursing behavior with CNN-based optical flow and features. Computers and Electronics in Agriculture, 189, 106384. (Year: 2021).*

Guo, S., Wang, S., Yang, Z., Wang, L., Zhang, H., Guo, P., . . . & Guo, J. (2022). A review of deep learning-based visual multi-object tracking algorithms for autonomous driving. Applied Sciences, 12(21), 10741. (Year: 2022).*

Tangirala, B., Bhandari, I., Laszlo, D., Gupta, D. K., Thomas, R. M., & Arya, D. (2021). Livestock Monitoring with Transformer. arXiv preprint arXiv:2111.00801. (Year: 2021).*

* cited by examiner

METHOD FOR COUNTING SUCKLING PIGLETS BASED ON SELF-ATTENTION SPATIOTEMPORAL FEATURE FUSION

CROSS REFERENCE TO RELATED APPLICATION

This patent application claims the benefit and priority of Chinese Patent Application No. 202211358233.X filed on Nov. 1, 2022, the disclosure of which is incorporated by reference herein in its entirety as part of the present application

TECHNICAL FIELD he present invention relates to the technical field of video-based behavior recognition, and more particularly to a method for counting piglets with suckling behaviors in combination with deep learning network density estimation and self-attention spatiotemporal feature fusion.

BACKGROUND

Due to insufficient nipples and nipple diseases of sows, limited lactation zones, internal competition of piglets and piglet illness, not all piglets show the suckling behavior at the same time during the sow lactation; and analyzing the number of the piglets with the suckling behavior is conducive to knowing the nutrition intake of the piglets and evaluating the maternal behavior ability of the sow from the perspective of the piglet. Judgment of the nutrition intake and health status of the piglets and the maternal merits of the sow by manually observing the suckling behavior of the piglets is time-consuming and labor-intensive and has aging lag, which makes it difficult to realize the long-term and continuous statistical analysis of the suckling behavior in a large-scale breeding mode. Automatic analysis of the number of suckling piglets by a computer vision technology not only saves the manpower, but also reduces the manual judgment errors.

The related prior art mainly uses computer vision to recognize a lactation behavior of the sow and does not analyze the number of the suckling piglets from the perspective of the piglets, so that the prior art cannot be directly used to evaluate the nutrition intake of the piglets.

At present, animal behavior recognition methods based on computer vision mainly focus on whether the behavior occurs or not, but cannot directly predict the number of animals with a certain behavior from density distribution. In scenarios of crates and pens, because of complicated illumination (such as interference by a heat lamp, darkness and the like), crowded cohesion of piglets and serious blocking by the sow and bars, it is very difficult to detect individuals with the suckling behavior one by one.

Therefore, a problem to be urgently solved by those skilled in the art is how to provide a method for efficiently and directly counting the suckling piglets.

SUMMARY

In view of this, the present invention provides a method for counting suckling piglets based on self-attention spatiotemporal feature fusion, which can provide key information for evaluating nutrition intake of the piglets by directly predicting the number of suckling piglets.

To realize the above purpose, the present invention adopts the following technical solution:

A method for counting suckling piglets based on self-attention spatiotemporal feature fusion includes the following steps:

S1, collecting a video containing a sow and a plurality of piglets;

S2, establishing a CenterNet network and a FlowNet network; detecting a video clip of the sow in a side-lying posture in the video by using the CenterNet network to extract a key frame sequence; and detecting an extended zone of a side-lying sow bounding box as a region of interest, and using the FlowNet network to acquire an optical flow image sequence corresponding to the key frame sequence;

S3, extracting spatial features and temporal features respectively from an RGB image in the key frame sequence and the optical flow sequence by using a two-stream CNN; transforming the extracted spatial features and temporal features into a spatial feature vector and a temporal feature vector by using a spatial transformation vector and a temporal transformation vector, respectively; and fusing the spatial feature vector and the temporal feature vector to obtain a summing feature vector;

S4, inputting the fused feature vector into a fusion transformer to output a vector as a query of a temporal transformer and a spatial transformer; inputting the temporal feature vector and the spatial feature vector respectively into the temporal transformer and the spatial transformer; summing and normalizing an outputted vector respectively with the temporal feature vector and the spatial feature vector; then inputting the vector into a feed-forward network; summing and normalizing the output of the feed-forward network respectively with the temporal feature vector and the spatial feature vector again to output a column vector and a row vector respectively; and further establishing a self-attention matrix;

S5, concatenating the spatial features and the temporal features outputted from the two-stream CNN to obtain fused spatiotemporal features, and performing an element-wise product on the fused spatiotemporal features and the self-attention matrix to obtain a self-attention spatiotemporal feature map; and S6, inputting the self-attention spatiotemporal feature map into a regression branch of a suckling piglet center point to output location estimation of the suckling piglets, and inputting the self-attention spatiotemporal feature map into a regression branch of the number of suckling piglets to output quantity estimation of the suckling piglets.

Preferably, the S2 of detecting the video clip of the sow in the side-lying posture in the video by using the CenterNet network to extract the key frame sequence, and detecting the extended zone of the side-lying sow bounding box as a region of interest specifically includes the following steps:

S211, inputting a video image into a preset sow localizing and sow posture classification network CenterNet, wherein if the posture of the sow is judged as side lying, the frame of image belongs to the key image sequence, and a sow detection result may be transferred into S212; and if the posture of the sow is judged as non-side lying, the frame of video image is filtered; and S212, extending length and width edges of the side-lying sow detection bounding box towards two ends by a same distance, wherein an extended range is used as the region of interest.

Preferably, the S3 specifically includes the following steps:

S31, selecting the RGB image in each key frame sequence and inputting into a spatial convolutional branch network, and extracting the spatial features from the key image sequence; and inputting all optical flow sequences corresponding to the key frame sequence into a branch network of the temporal convolutional network, and extracting the temporal features from the key image sequence;

S32, multiplying the learned temporal transformation vector and the spatial transformation vector respectively with the spatial features and the temporal features extracted in S31 to obtain the spatial feature vector and the temporal feature vector, and respectively superimposing position embeddings; and S33, summing the spatial feature vector and the temporal feature vector after superimposed with the position embeddings obtained in S32 to obtain the fused feature vector.

Preferably, the S4 specifically includes the following steps:

S41, inputting the fused feature vector into a fusion transformer to output the vector as the query of the temporal transformer and the spatial transformer;

S42, using the temporal feature vector and the spatial feature vector respectively as a key and a value of the temporal transformer and the spatial transformer;

S43, summing and normalizing outputs of the temporal transformer and the spatial transformer respectively with the temporal feature vector and the spatial feature vector, and inputting the summed and normalized vector into a temporal feed-forward network and a spatial feed-forward network, wherein each of the temporal feed-forward network and the spatial feed-forward network is composed of two fully connected layers; and S44, summing and normalizing outputs of the temporal feed-forward network and the spatial feed-forward network respectively with the temporal feature vector and the spatial feature vector to respectively output a column vector and a row vector; and multiplying the column vector and the row vector to obtain the self-attention matrix.

Preferably, the S5 specifically includes the following steps:

S51, concatenating the spatial features and the temporal features outputted from the two-stream CNN according to channels to obtain the fused spatiotemporal features;

S52, performing element-wise product for the fused spatiotemporal features and the self-attention matrix to obtain the self-attention spatiotemporal feature maps.

Preferably, the S6 of inputting the self-attention spatiotemporal feature map into the regression branch of the suckling piglet center point to output the location estimation of the suckling piglets specifically includes the following steps:

S611, establishing spatial location Gaussian probability distribution of a target by taking a center point coordinate of a suckling piglet bounding box of a training video frame as a target location, taking the target location as a Gaussian core center and taking a radius of a minimum circumcircle of the bounding box as a Gaussian core radius; superimposing the spatial location Gaussian probability distribution of all targets to obtain a ground-truth probability heat map of the suckling piglet center point, corresponding to the video image frame, for model training, wherein a loss function of the regression branch of the suckling piglet center point is as follows:

$$L_{centerpoint} = \frac{-1}{N}\sum_{xyc}\begin{cases}(1-\hat{Y}_{xyc})^\alpha \log(\hat{Y}_{xyc}) & Y_{xyc}=1 \\ (1-Y_{xyc})^\beta(\hat{Y}_{xyc})^\alpha \log(1-\hat{Y}_{xyc}) & otherwise\end{cases}$$

wherein N represents the number of targets in the heat map, $Y_{xyc}$ represents a numerical value on the ground-truth heat map, $\hat{Y}_{xyc}$ represents a numerical value on a predicted heat map; and $\alpha=1$, and $\beta=2$;

S612, inputting the self-attention spatiotemporal feature map obtained from a to-be-detected video image into the regression branch of the suckling piglet center point to obtain a probability heat map of the suckling piglet center point; screening out a coordinate of a candidate center point by a maximal pooling operation; and finally outputting the center point coordinate of the suckling piglets with the probability greater than a threshold p.

Preferably, the S6 of inputting the self-attention spatiotemporal feature map into the regression branch of the number of the suckling piglets to output the quantity estimation of the suckling piglets specifically includes the following steps:

S621, continuously extracting features from the self-attention spatiotemporal feature map of the training video frame by using a two-layer convolutional network; and generating a ground-truth Gaussian distribution heat map $F_g$ of suckling piglet density for model training by taking the center point coordinate of the suckling piglet bounding box as a Gaussian two-dimensional distribution center, wherein the loss function $L_{number}$ of the regression branch of the number of the suckling piglets is an Euclidean distance loss of the network predicted heat maps $F_p$ and $F_g$:

$$L_{number}=\Sigma\|F_p-F_g\|^2$$

obtaining a sum of the $L_{centerpoint}$ and $L_{number}$ as a final loss function L for training a suckling piglet counting network:

$$L=L_{centerpoint}+L_{number}$$

S622, inputting the self-attention spatiotemporal feature map extracted from the to-be-detected video image into the regression branch of the number of the suckling piglets, and adding all predicted density distribution heat map elements of the suckling piglets to obtain a numerical value as the number of the piglets showing suckling behaviors in the video clip, to complete the counting of the suckling piglets.

The present invention further provides a computer readable medium; the readable medium stores instructions; and when the instructions are executed on the readable medium, the readable medium executes the method for counting the suckling piglets based on the self-attention spatiotemporal feature fusion.

The present invention further provides an electronic device, which includes a memory and a processor; the memory stores computer programs capable of being run on the processor; and when executing the computer programs, the processor implements the method for counting the suckling piglets based on the self-attention spatiotemporal feature fusion.

It may be seen from the above technical solutions that compared with the prior art, the present invention discloses the method for counting the suckling piglets based on the self-attention spatiotemporal feature fusion. Firstly, the CenterNet is used to detect the side-lying sow in the video frame so as to acquire the key frame of the suckling piglets and the region of interest in the video, and the interference of the movement of the non-suckling piglets on the spatiotemporal feature extraction for the region of interest is overcome; then the spatiotemporal two-stream convolutional network is used to extract the spatiotemporal features of the key frame video clip; the spatiotemporal features are transformed into the spatiotemporal feature vector, and inputted into the temporal transformer, the spatial transformer and the fusion transformer to obtain the self-attention matrix; element-wise product is performed for the self-attention matrix and the fused spatiotemporal features; and the self-attention spatiotemporal feature map is inputted into the regression branch of the number of the suckling piglets to complete the counting of the suckling piglets. The present invention makes full use of the multi-channel transformers to perform the spatiotemporal dual-mode data feature fusion; and in combination with density evaluation of the deep learning network, the efficient quantity regression of the suckling piglets is realized.

The present invention has the following beneficial effects:

(1) The method for using the learned spatial transformation vector and the temporal transformation vector to transform the spatial feature matrix and the temporal feature matrix into the feature vectors is disclosed, so that the spatiotemporal transformation vector can be transformed into the feature vector on the basis of a data-driven manner, which avoids the conventional practice that the input of the transformer needs to flatten the inputted two-dimensional matrix pixels.

(2) The self-attention spatiotemporal feature map acquisition method based on the temporal, spatial and fusion transformers improves the spatiotemporal feature expression ability of the piglet suckling behavior.

(3) The number of the piglets with the suckling behavior in the video clip is directly expressed by innovatively using the heat maps, so that the indirect method for obtaining the number of the suckling piglets by gradually judging the suckling behaviors of the piglets one by one through a multi-target tracking method can be avoided.

BRIEF DESCRIPTION OF DRAWINGS

To more clearly describe the technical solutions in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

DETAILED DESCRIPTION OF THE EMBODIMENTS

The technical solutions in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
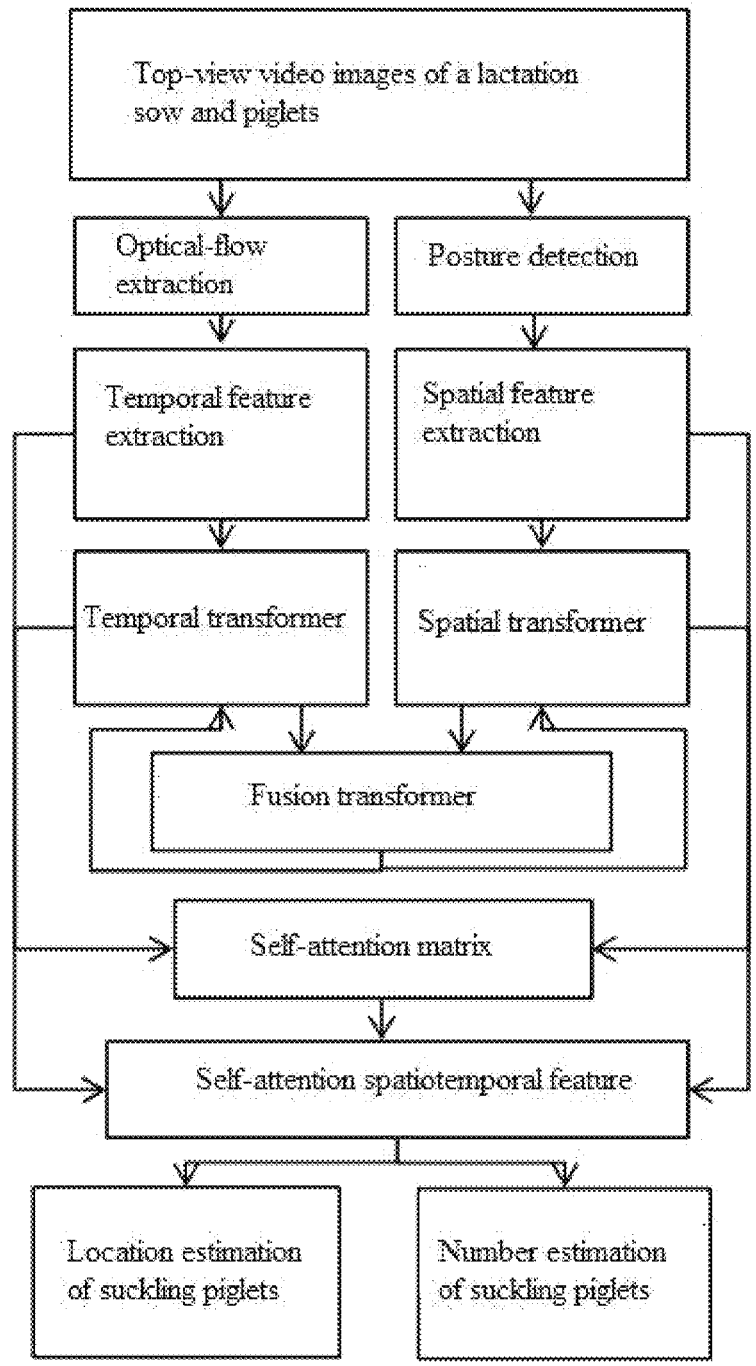
FIG. 1 is a structural diagram of a suckling piglet counting deep learning network provided by the present invention.

A first aspect of an embodiment of the present invention discloses a method for counting suckling piglets based on self-attention spatiotemporal feature fusion, which is executed according to an integral suckling piglet counting network architecture. Firstly, CenterNet is used to detect a side-lying sow in a video frame so as to acquire a key frame of the suckling piglets and a region of interest of the video frame, and the interference of the movement of non-suckling piglets on the spatiotemporal feature extraction for the region of interest is overcome; then spatiotemporal features extracted by a spatiotemporal two-stream convolutional network from a key frame video clip are transformed into a spatiotemporal feature vector, and inputted into a temporal transformer, a spatial transformer and a fusion transformer to obtain a self-attention matrix; element-wise product is performed for the self-attention matrix and the fused spatiotemporal features to obtain a self-attention spatiotemporal feature map; and the self-attention spatiotemporal feature map is inputted into a regression branch of the number of suckling piglets to complete the counting of the suckling piglets. The present invention makes full use of a self-attention focus of the multi-channel transformers based on the spatiotemporal dual-mode data features to extract the efficient self-attention spatiotemporal feature map, which realizes the direct and rapid counting of the suckling piglets, thereby solving the problem that the suckling frequency of the piglets is difficult to manually evaluate. As shown in FIG. 1, the method includes the following steps:

S1, a video containing a sow and a plurality of piglets is collected;

S2, a CenterNet network and a FlowNet network are established; the CenterNet network is used to detect a video clip of the sow in a side-lying posture in the video so as to extract a key frame sequence; an extended area of a side-lying sow bounding box is detected as a region of interest; and the FlowNet network is used to acquire an optical flow image sequence corresponding to the key frame sequence;

S3, a two-stream CNN is used to extract spatial features and temporal features respectively from an RGB image in the key frame sequence and the optical flow sequence; a spatial transformation vector and a temporal transformation vector are used to transform the extracted spatial features and temporal features into a spatial feature vector and a temporal feature vector; and the spatial feature vector and the temporal feature vector are summed and fused to obtain a fused feature vector;

S4, the fused feature vector is inputted into a fusion transformer to output a vector as a query of the temporal transformer and the spatial transformer; the temporal feature vector and the spatial feature vector are inputted respectively into the temporal transformer and the spatial transformer to output vectors which are summed and normalized respectively with the temporal feature vector and the spatial feature vector and then inputted into a feed-forward network; the output of the feed-forward network is summed and normalized again with the temporal feature vector and the spatial feature vector to output a column vector and a row vector respectively; and then a self-attention matrix is established;

S5, the spatial features and the temporal features outputted from the two-stream CNN are concatenated to obtain fused spatiotemporal features, and an element-wise product is performed for the fused spatiotemporal features and the self-attention matrix to obtain a self-attention spatiotemporal feature map; and S6, the self-attention spatiotemporal feature map is inputted into a regression branch of a suckling piglet center point to output location estimation of the suckling piglets, and the self-attention spatiotemporal feature map is inputted into a regression branch of the number of suckling piglets to output quantity estimation of the suckling piglets.

In an embodiment, prior to the detection of video images, a training set and a test set of a network model are established at first, including a sow detection data set D1, a suckling piglet counting network data set D2 and a training set KITTI of an optical flow generation network FlowNet. Specific execution steps are as follows:

S11, data collection: an image collection system for photographing a top-view video is installed right above a pigpen to collect a video containing a sow and a plurality of suckling piglets, and a video collection frame rate is f;

S12, sample clip: the video is clipped into video clips with an equal duration of a seconds;

S13, data annotation: a location and a body range of the sow are localized by using abounding box in target detection; a video image classification label of the sow in the side-lying posture is "1"; otherwise, the label is "0"; and the location of the piglet with a suckling duration of a seconds is localized by using a bounding box in each video clip with the duration of a seconds; and S14, a training data set is increased by vertical flip, horizontal flip and 180-degree rotation.

The video image classification label of the sow in the side-lying posture and the video data of the sow bounding box constitute the sow detection data set D1; and the video data with the location localizing bounding box of the piglets with suckling duration of a seconds constitutes the suckling piglet counting network data set D2.

In an embodiment, in S2, the CenterNet network is used to detect the video clip of the sow in the side-lying posture in the video so as to extract the key image frame sequence, and the extended zone of the side-lying sow bounding box is detected as the region of interest, which specifically includes the following steps:

S211, the video image is inputted into a preset sow localizing and sow posture detection network CenterNet; if the posture of the sow is judged as side lying, the image belongs to the key image sequence, and a detection result of the sow may be transferred into S212; and if the posture of the sow is judged as non-side lying, the frame of video image is filtered;

S212, length edges and width edges of the side-lying sow detection bounding box are extended towards two ends by a same distance, and an extension length is respectively ½ of a length of the length and width edges; the extended bounding box range is used as the region of interest; and all image pixel values outside the region of interest is set to 0.

In the present embodiment, prior to the execution of S211, the method also include a step of training the CenterNet by using D1.

In an embodiment, in S2, the FlowNet network is used to acquire the optical flow image sequence corresponding to the key image frame sequence, which specifically includes the following steps:

S221, a KITTI common data set is used to train the FlowNet; and

S222, the key image sequence is inputted into an optical flow calculation network FlowNet, and an optical flow image sequence of the lactation sow and the piglets is extracted from the key image sequence.

Figure 2:
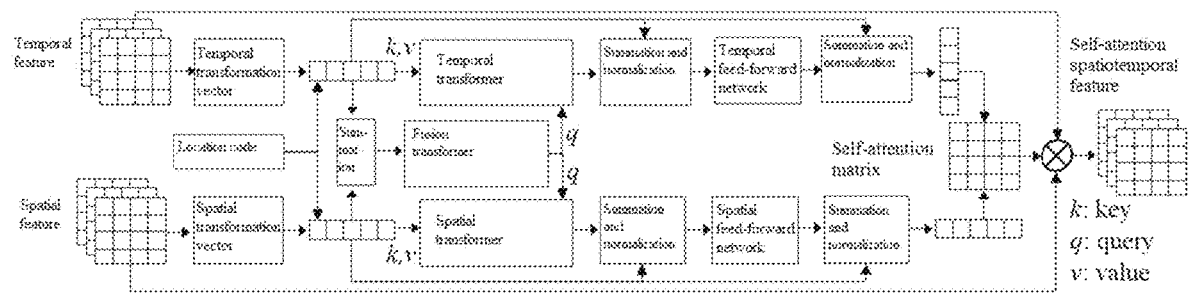
FIG. 2 is a structural diagram of a self-attention spatiotemporal feature fusion network provided by the present invention.

In an embodiment, as shown in FIG. 2, S3 specifically includes the following steps:

S31, each clipped video clip has a×f frames, and the RGB images of the first frame, the $(½×a×f)^{th}$ frame and the $(a×f)^{th}$ frame are inputted into a spatial convolutional branch network ResNet-50 to extract the spatial features of the key image sequence; and all optical flow sequences corresponding to the video clip are inputted into a temporal convolutional network branch ResNet-50 to extract the temporal features of the key image sequence; and S32, the learned temporal transformation vector and the spatial transformation vector are respectively multiplied with the spatial features and the temporal features extracted in S31 to obtain the spatial feature vector and the temporal feature vector; and the learned temporal transformation vector and the spatial transformation vector may transform a two-dimensional matrix into a one-dimensional vector; for example, if the spatial features outputted from S31 are h×w dimensions, the dimension of the learned spatial transformation vector is w×1, and the extracted spatial feature vector is [h×w]×[w×1]=[h×1]; and the temporal feature vector may be obtained in a similar way, and the feature vectors are respectively superimposed with position embeddings.

S33, the spatial feature vector and temporal feature vector superimposed with the position embeddings obtained in S32 are summed to obtain a fused feature vector.

In an embodiment, S4 specifically includes the following steps:

S41, the fused feature vector is inputted into the fusion transformer to output the vector as the query of the temporal transformer and the spatial transformer;

S42, the temporal feature vector and the spatial feature vector are respectively used as a key and a value of the temporal transformer and the spatial transformer;

S43, outputs of the temporal transformer and the spatial transformer are summed and normalized respectively with the temporal feature vector and the spatial feature vector, and then inputted respectively into a temporal feed-forward network and a spatial feed-forward network, wherein each of the temporal feed-forward network and the spatial feed-forward network is composed of two fully connected layers;

S44, outputs of the temporal feed-forward network and the spatial feed-forward network are summed and normalized respectively with the temporal feature vector and the spatial feature vector to respectively output a column vector and a row vector; and the column vector and the row vector are multiplied to obtain the self-attention matrix.

In an embodiment, S5 specifically includes the following steps:

S51, the spatial features and the temporal features outputted from the two-stream CNN are concatenated according to channels to obtain the fused spatiotemporal features; and S52, element-wise product is performed for the fused spatiotemporal features and the self-attention matrix to obtain the self-attention spatiotemporal feature map.

Figure 3:
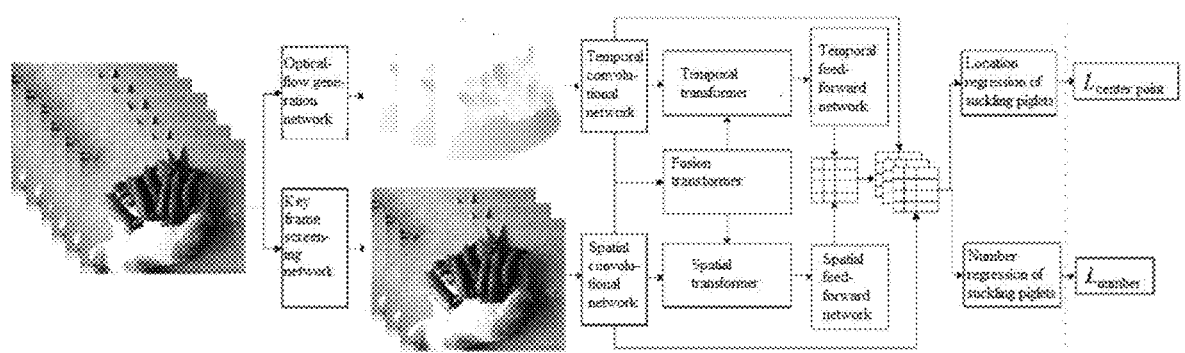
FIG. 3 is a flow chart of a method for counting suckling piglets based on self-attention spatiotemporal feature fusion provided by the present invention.

In an embodiment, as shown in FIG. 3, in S6, the self-attention spatiotemporal feature map is inputted into the regression branch of the suckling piglet center point network to output the location estimation of the suckling piglets, which specifically includes the following steps:

S611, for a suckling piglet in annotation data in the training set, a center point coordinate of a suckling piglet bounding box of the $(½×a×f)^{th}$ frame is taken as a target location; spatial location Gaussian probability distribution of the target is established by taking the target location as a Gaussian core center and taking a radius of a minimum circumcircle of the bounding box as a Gaussian core radius; the spatial location Gaussian probability distribution of all targets is superimposed to obtain a ground-truth center point probability heat map corresponding to the video image frame for model training; and a loss function of the regression branch of the suckling piglet center point is as follows:

$$L_{centerpoint} = \frac{-1}{N} \sum_{xyc} \begin{cases} (1-\hat{Y}_{xyc})^\alpha \log(\hat{Y}_{xyc}) & Y_{xyc} = 1 \\ (1-Y_{xyc})^\beta (\hat{Y}_{xyc})^\alpha \log(1-\hat{Y}_{xyc}) & \text{otherwise} \end{cases}$$

wherein N represents the number of targets in the heat map, $Y_{xyc}$ represents a numerical value on the ground-truth heat map, $\hat{Y}_{xyc}$ represents a numerical value on a predicted heat map; and the effect is optimal when $\alpha=1$, and $\beta=2$;

S612, the self-attention spatiotemporal feature map obtained from a to-be-detected video image is inputted into the regression branch of the suckling piglet center point to obtain the probability heat map of the suckling piglet center point; a coordinate of a suspected center point is screened out as a candidate by a 3×3 maximal pooling operation; and finally the center point coordinate of the suckling piglets with the probability p>0.5 is outputted.

In an embodiment, as shown in FIG. 3, in S6, the self-attention spatiotemporal feature map is inputted into a regression branch of the number of suckling piglets to output the quantity estimation of the suckling piglets, which specifically includes the following steps:

S621, a two-layer convolutional network is used to continuously extract features from the self-attention spatiotemporal feature map of a training video frame; and a ground-truth Gaussian distribution heat map $F_g$ of suckling piglet density is generated for model training by taking the center point coordinate of the suckling piglet bounding box of the $(½×a×f)^{th}$ frame as the Gaussian two-dimensional distribution center, wherein the loss function $L_{number}$ of the regression branch of the number of the suckling piglets is an Euclidean distance loss of the network predicted heat maps $F_p$ and $F_g$:

$$L_{number}=\Sigma\|F_p-F_g\|^2$$

A sum of $L_{centerpoint}$ and $L_{number}$ is used as the final loss function L for training an integral suckling piglet counting network:

$$L=L_{centerpoint}+L_{number}$$

Figure 4:
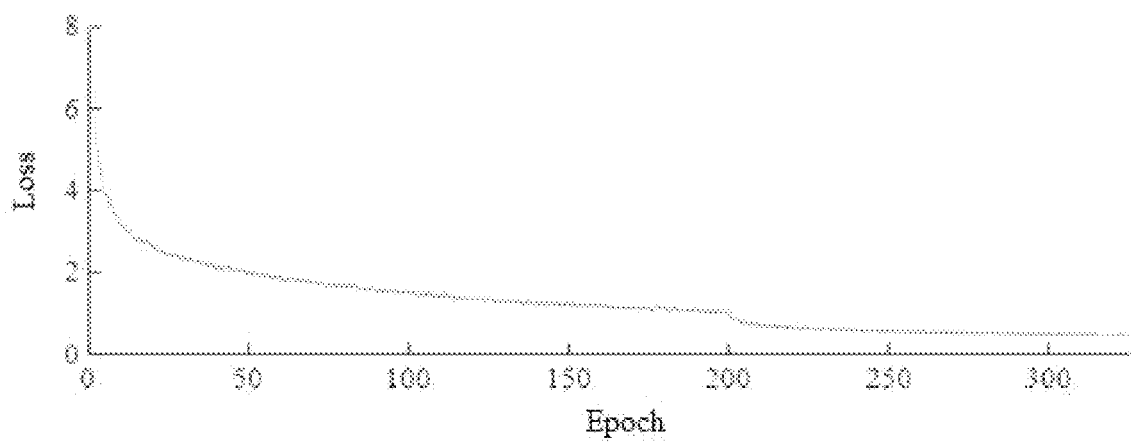
FIG. 4 is a variation diagram of a loss function for training the suckling piglet counting network provided by the present invention.

The loss function of a training process is as shown in FIG. 4.

S622, the self-attention spatiotemporal feature map extracted from the to-be-detected video image is inputted into the regression branch of the number of the suckling piglets, and all predicted density distribution heat map elements of the suckling piglets are added to obtain a numerical value as the number of the piglets showing suckling behaviors in the video clip, to complete the counting of the suckling piglets.

A second aspect of an embodiment of the present invention furthers discloses a computer readable medium; the readable medium stores instructions; and when the instructions are executed on the readable medium, the readable medium executes the method for counting the suckling piglets based on the self-attention spatiotemporal feature fusion disclosed in the first aspect.

A third aspect of an embodiment of the present invention further provides an electronic device, which includes a memory and a processor; the memory stores computer programs capable of being run on the processor; and when executing the computer programs, the processor implements the method for counting the suckling piglets based on the self-attention spatiotemporal feature fusion disclosed in the first aspect.

A test result obtained by predicting the number of suckling piglets by using the test set in the embodiments of the present invention is shown below:

A correlation coefficient $R^2$ and a mean square error MSE are used as evaluation indexes of the test set in the data set D2, which are defined as follows:

$$R^2 = 1 - \frac{\sum_{i=1}^n (y_i - \hat{y}_i)^2}{\sum_{i=1}^n (y_i - \bar{y})^2}$$

$$MSE = \frac{1}{n}\sum_{i=1}^n (y_i - \hat{y}_i)^2$$

In the formula, n indicates a total number of test samples; and $y_i$, $\hat{y}_i$ and $\bar{y}$ represent the number of suckling piglets, a predicted value and an average value separately.

Figure 5:
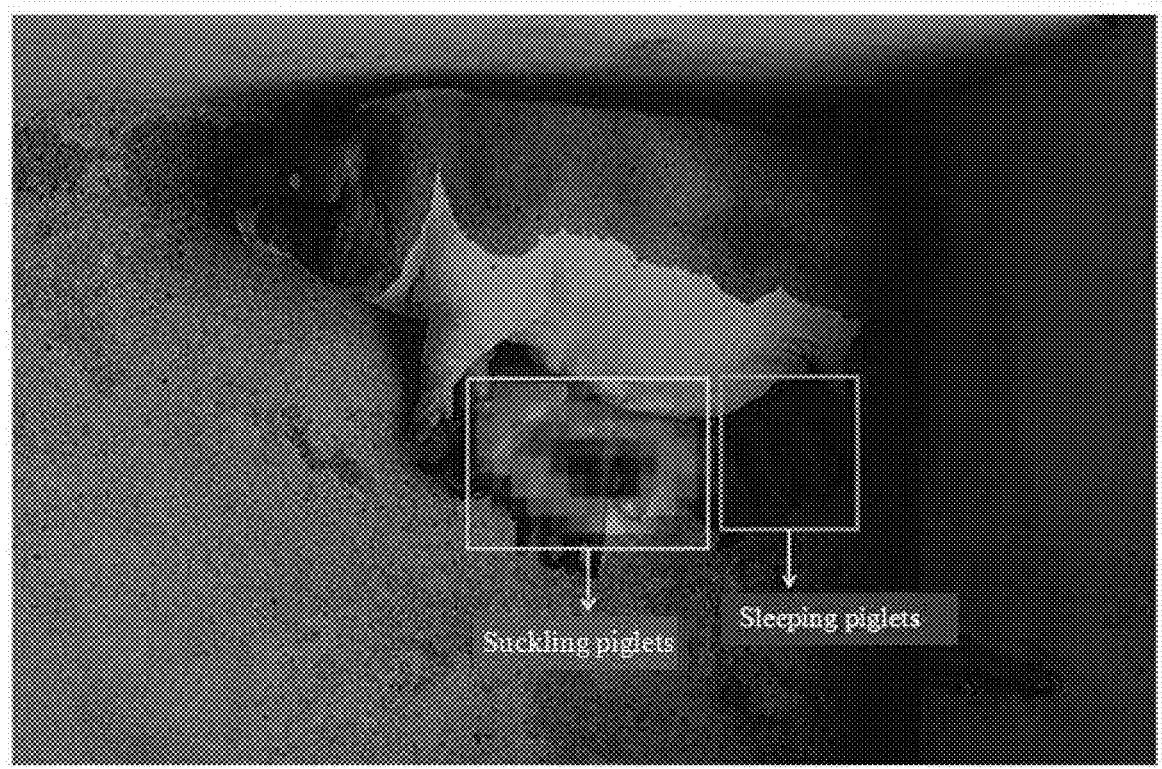
FIG. 5 is a heat map of a predicted result of the suckling piglet counting network provided by the present invention.
Figure 6:
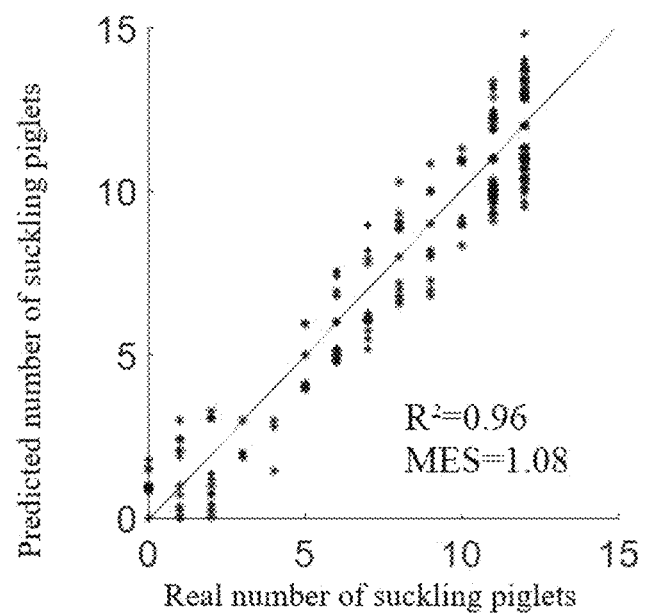
FIG. 6 is a diagram showing a comparison effect between a predicted result and a real value of the number of suckling piglets of a discrete sample of a test set provided by the present invention.
Figure 7:
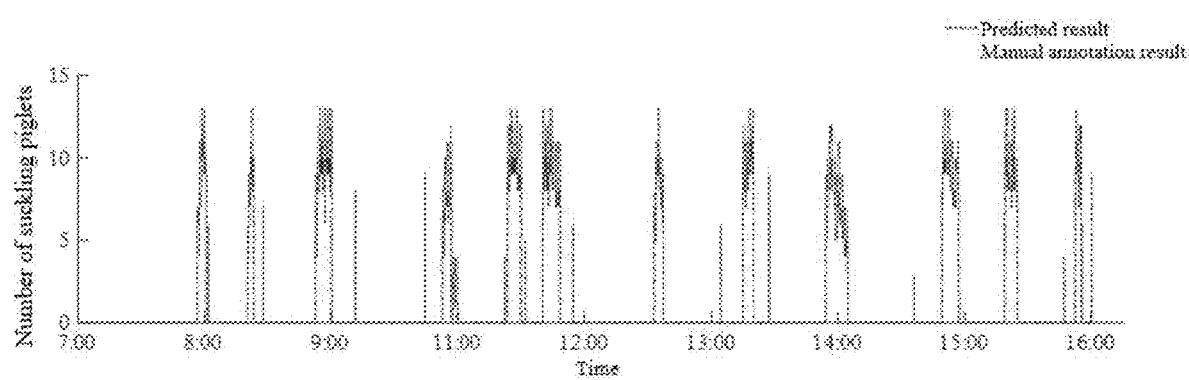
FIG. 7 is a diagram showing a continuous video test result provided by the present invention.

As shown in FIG. 5-FIG. 7, the test set includes 250 discrete samples and a continuous video of a lactation sow and piglets. FIG. 5 is a number regression heat map of the suckling piglets outputted from the network, and the network can apparently distinguish the suckling piglets and the non-suckling piglets; in FIG. 6, $R^2$ and MSE are 0.96 and 1.08; and the real number of the suckling piglets in FIG. 7 is very close to the predicted number, which reflects the effectiveness of the present invention.

In conclusion, by adopting the above solutions, the present invention provides a novel method for estimating the number of piglets with the suckling behavior in a piggery environment, which can effectively solve the problems of time and labor waste in the traditional manual monitoring way, overcome the disadvantages that the piglets are crowded, glued and easily blocked in a large-scale pig breeding scenario, and realize the intelligent method for counting the suckling piglets, thereby providing technical reference for monitoring the nutrition intake of the piglets in automatic breeding.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A method for counting suckling piglets based on self-attention spatiotemporal feature fusion, comprising the following steps:
    S1, collecting a video containing a sow and a plurality of piglets;
    S2, establishing a CenterNet network and a FlowNet network; detecting a video clip of the sow in a side-lying posture in the video by using the CenterNet network to extract a key frame sequence;
    and detecting an extended zone of a side-lying sow bounding box as a region of interest, and using the FlowNet network to acquire an optical flow image sequence corresponding to the key frame sequence;
    S3, extracting spatial features and temporal features respectively from an RGB image in the key frame sequence and the optical flow sequence by using a two-stream CNN; transforming the extracted spatial features and temporal features into a spatial feature vector and a temporal feature vector by using a spatial transformation vector and a temporal transformation vector; and summing the spatial feature vector and the temporal feature vector to obtain a fused feature vector;
    S4, inputting the fused feature vector into a fusion transformer to output a vector as a query of a temporal transformer and a spatial transformer; inputting the temporal feature vector and the spatial feature vector respectively into the temporal transformer and the spatial transformer; summing and normalizing the outputted vector respectively with the temporal feature vector and the spatial feature vector; then inputting the vector into a feed-forward network; summing and normalizing the output of the feed-forward network respectively with the temporal feature vector and the spatial feature vector again to output a column vector and a row vector respectively; and further establishing a self-attention matrix;
    S5, concatenating the spatial features and the temporal features outputted from the two-stream CNN to obtain fused spatiotemporal features, and performing an element-wise product for the fused spatiotemporal features and the self-attention matrix to obtain a self-attention spatiotemporal feature map; and
    S6, inputting the self-attention spatiotemporal feature map into are regression branch of a suckling piglet center point to output location estimation of the suckling piglets, and inputting the self-attention spatiotemporal feature map into a regression branch of the number of suckling piglets to output quantity estimation of the suckling piglets.

2. The method for counting suckling piglets based on self-attention spatiotemporal feature fusion according to claim 1, wherein the S2 of detecting the video clip of the sow in the side-lying posture in the video by using the CenterNet network to extract the key frame sequence, and detecting the extended zone of the side-lying sow bounding box as a region of interest specifically comprises the following steps:
    S211, inputting a video image into a preset sow positioning and sow posture classification network CenterNet, wherein if the posture of the sow is judged as side lying, the frame of image belongs to the key image sequence, and a sow detection result is transferred into S212; and if the posture of the sow is judged as non-side lying, the frame of video image is filtered; and
    S212, extending length and width edges of the side-lying sow detection bounding box towards two ends by a same distance, wherein an extended range is used as the region of interest.

3. The method for counting suckling piglets based on self-attention spatiotemporal feature fusion according to claim 1, wherein the S3 specifically comprises the following steps:
    S31, selecting the RGB image in each key frame sequence and inputting into a spatial convolutional branch network, and extracting the spatial features from the key image sequence; and inputting all optical flow sequences corresponding to the key frame sequence into a branch network of the temporal convolutional network, and extracting the temporal features from the key image sequence;
    S32, multiplying the learned temporal transformation vector and the spatial transformation vector respectively with the spatial features and the temporal features extracted in S31 to obtain the spatial feature vector and the temporal feature vector, and respectively superimposing position embeddings; and
    S33, summing the spatial feature vector and the temporal feature vector after superimposed with the position embeddings obtained in S32 to obtain the fused feature vector.

4. The method for counting suckling piglets based on self-attention spatiotemporal feature fusion according to claim 1, wherein the S4 specifically comprises the following steps:
    S41, inputting the fused feature vector into a fusion transformer to output the vector as the query of the temporal transformer and the spatial transformer;
    S42, using the temporal feature vector and the spatial feature vector respectively as a key and a value of the temporal transformer and the spatial transformer;
    S43, summing and normalizing outputs of the temporal transformer and the spatial transformer respectively with the temporal feature vector and the spatial feature vector, and inputting the summed and normalized vector into a temporal feed-forward network and a spatial feed-forward network, wherein each of the temporal feed-forward network and the spatial feed-forward network is composed of two fully connected layers; and
    S44, summing and normalizing outputs of the temporal feed-forward network and the spatial feed-forward network respectively with the temporal feature vector and the spatial feature vector to respectively output a column vector and a row vector; and multiplying the column vector and the row vector to obtain the self-attention matrix.

5. The method for counting suckling piglets based on self-attention spatiotemporal feature fusion according to claim 1, wherein the S5 specifically comprises the following steps:
    S51, concatenating the spatial features and the temporal features outputted from the two-stream CNN according to channels to obtain the fused spatiotemporal features; and
    S52, performing element-wise product for the fused spatiotemporal features and the self-attention matrix to obtain the self-attention spatiotemporal feature map.

6. The method for counting suckling piglets based on self-attention spatiotemporal feature fusion according to claim 1, wherein the S6 of inputting the self-attention spatiotemporal feature map into the regression branch of the suckling piglet center point to output the location estimation of the suckling piglets specifically comprises the following steps:

S611, establishing spatial location Gaussian probability distribution of a target by taking a center point coordinate of a suckling piglet bounding box of a training video frame as a target location, taking the target location as a Gaussian core center and taking a radius of a minimum circumcircle of the bounding box as a Gaussian core radius; superimposing the spatial location Gaussian probability distribution of all targets to obtain a ground-truth probability heat map of the suckling piglet center point, corresponding to the video image frame, for model training, wherein a loss function of the regression branch of the suckling piglet center point is as follows:

$$L_{centerpoint} = \frac{-1}{N}\sum_{xyc}\begin{cases}(1-\hat{Y}_{xyc})^{\alpha}\log(\hat{Y}_{xyc}) & Y_{xyc}=1 \\ (1-Y_{xyc})^{\beta}(\hat{Y}_{xyc})^{\alpha}\log(1-\hat{Y}_{xyc}) & \text{otherwise}\end{cases}$$

wherein N represents the number of targets in the heat map, $Y_{xyc}$ represents a numerical value on the ground-truth heat map, $\hat{Y}_{xyc}$ represents a numerical value on a predicted heat map; and $\alpha=1$, and $\beta=2$;

S612, inputting the self-attention spatiotemporal feature map obtained from a to-be-detected video image into the regression branch of the suckling piglet center point to obtain a probability heat map of the suckling piglet center point; screening out a coordinate of a candidate center point by a maximal pooling operation; and finally outputting the center point coordinate of the suckling piglets with the probability greater than a threshold p.

7. The method for counting suckling piglets based on self-attention spatiotemporal feature fusion according to claim 6, wherein the S6 of inputting the self-attention spatiotemporal feature map into the regression branch of the number of the suckling piglets to output the quantity estimation of the suckling piglets specifically comprises the following steps:

S621, continuously extracting features from the self-attention spatiotemporal feature map of the training video frame by using a two-layer convolutional network; and generating a ground-truth Gaussian distribution heat map $F_g$ of suckling piglet density for model training by taking the center point coordinate of the suckling piglet bounding box as a Gaussian two-dimensional distribution center, wherein the loss function $L_{number}$ of the regression branch of the number of the suckling piglets is an Euclidean distance loss of the network predicted heat maps $F_p$ and $F_g$:

$$L_{number}=\Sigma\|F_p-F_g\|^2$$

obtaining a sum of the $L_{centerpoint}$ and $L_{number}$ as a final loss function L for training a suckling piglet counting network:

$$L=L_{centerpoint}+L_{number}$$

S622, inputting the self-attention spatiotemporal feature map extracted from the to-be-detected video image into the regression branch of the number of the suckling piglets, and adding all predicted density distribution heat map elements of the suckling piglets to obtain a numerical value as the number of the piglets showing suckling behaviors in the video clip, to complete the counting of the suckling piglets.

8. A non-transitory computer readable medium, storing instructions, wherein the instructions are executed on the readable medium, the readable medium executes the method of claim 1.

9. An electronic device, comprising a memory and a processor, wherein the memory stores computer programs capable of being run on the processor; and when executing the computer programs, the processor implements the method of claim 1.

* * * * *